April 28, 1959     H. E. STEVENS     2,884,595
BI-DIRECTIONAL SINGLE UNIT SAMPLING DEVICE
Filed Jan. 30, 1957     2 Sheets-Sheet 1
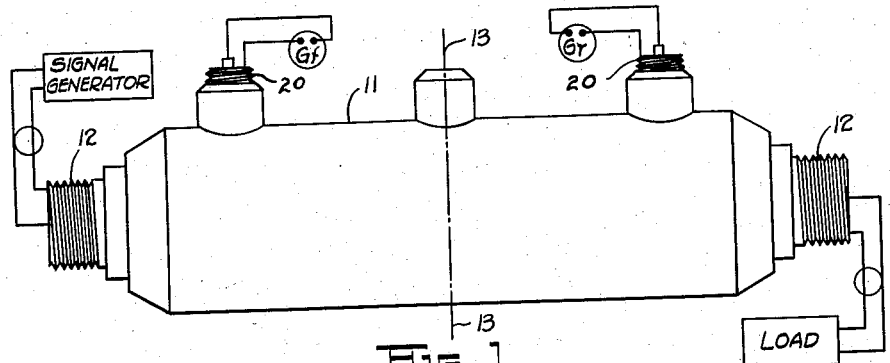
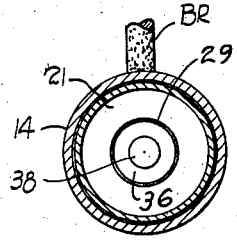
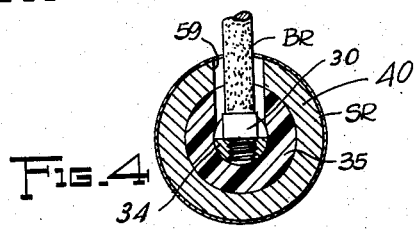
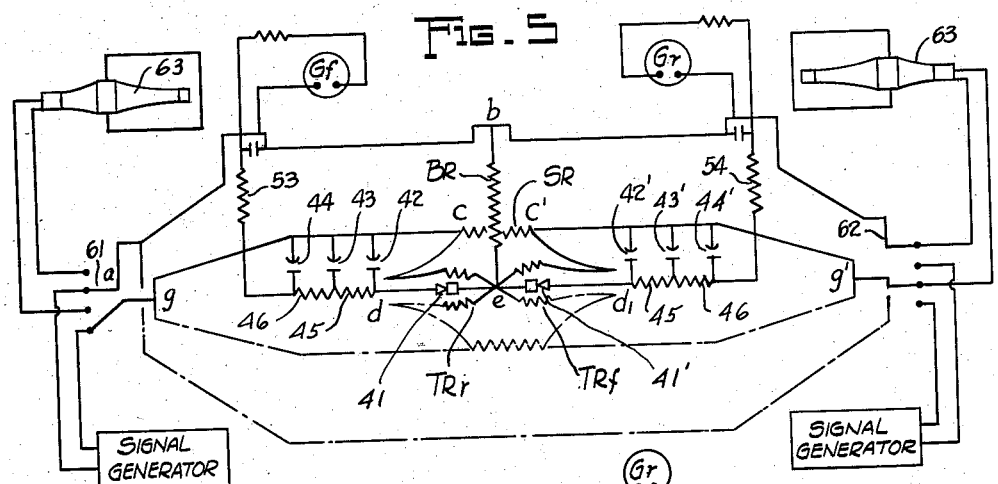
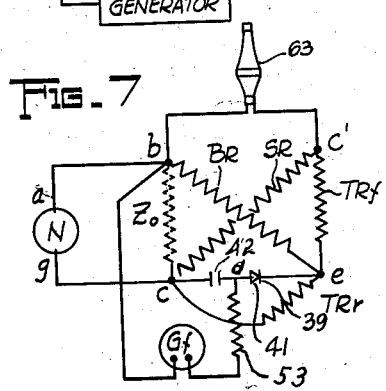
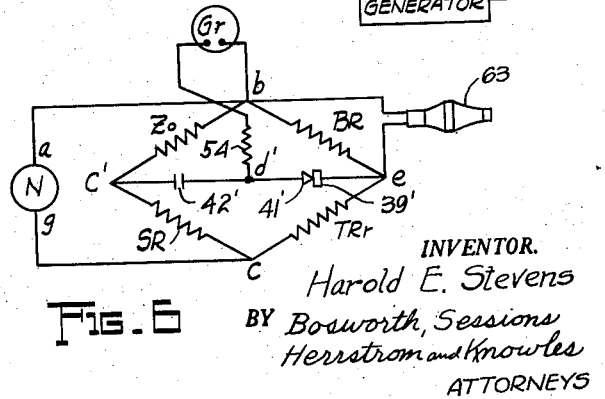
INVENTOR.
Harold E. Stevens
BY Bosworth, Sessions
Herrstrom and Knowles
ATTORNEYS

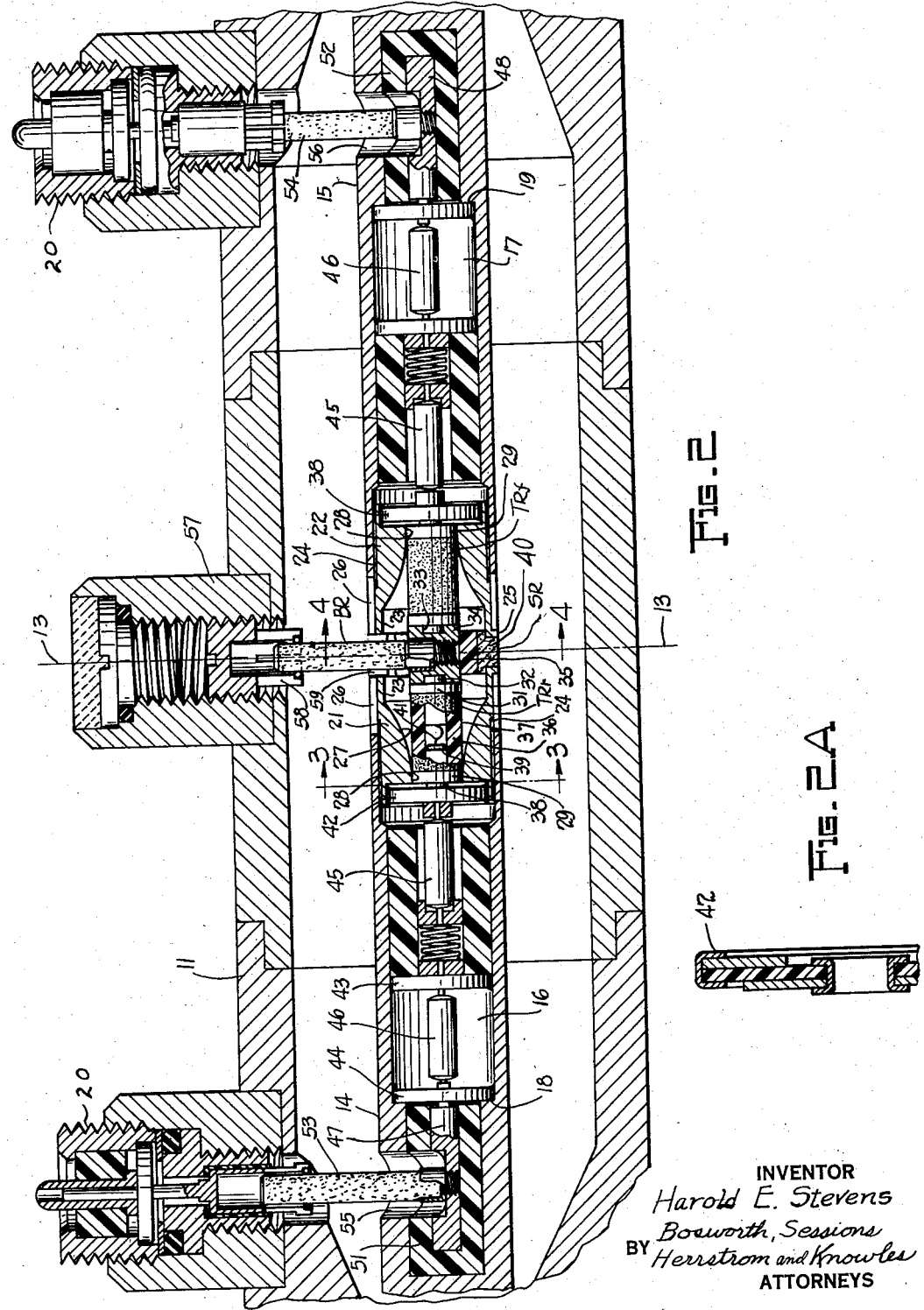

United States Patent Office 2,884,595
Patented Apr. 28, 1959

2,884,595

BI-DIRECTIONAL SINGLE UNIT SAMPLING DEVICE

Harold E. Stevens, Lyndhurst, Ohio, assignor to Bird Electronic Corporation, Cleveland, Ohio, a corporation of Ohio Application January 30, 1957, Serial No. 637,308

15 Claims. (Cl. 324—95)

This invention relates to indicators or meters for high frequency electrical energy and more particularly to the sampling for measurement and like purposes of wave energy transmitted along a coaxial line.

An object of the invention is to provide an improved type of hollow center conductor and mounting structure for a rectifier and sampling resistor in a center conductor for use in an insertion type measuring unit.

A further object is to provide an improved center conductor structure suitable for a non-frequency selective coupler or sampler.

Still another object is to provide a center conductor suitable for a bi-directional type coupler or sampler.

Still another object is to accomplish bi-directional energy or current detection in coaxial line radio frequency apparatus without duplication of direct-current return circuit means.

A further object is to enable bi-directional indication of radio frequency current or energy to be accomplished by utilization of a single series sampling resistor in a coaxial line conductor.

Other and further objects, features, and advantages of the invention will become apparent as the description proceeds.

A center conductor means constituting the subject matter of this application is suitable for use in insertion devices of the general type described in the copending application of James R. Bird and Harold E. Stevens, Serial No. 224,762, filed May 5, 1951. Reference is made to my co-pending application for patent Serial No. 637,307, filed January 30, 1957, for Unidirectional Sampling Device for Insertion in High Frequency Coaxial Electrical Transmission Line. However, structural features of the center conductor means described herein may also be used in non-directional couplers or insertion devices.

In insertion meters, the measurement of electrical quantities such as power, voltage or current in a radio frequency system is accomplished by rectifying a sample of the radio frequency energy and directing the sample of energy through a direct-current measuring or indicating circuit externally of the coaxial line unit which has been inserted in the radio frequency system.

One of the features of the measuring arrangement of insertion meters such as described in the aforesaid Bird and Stevens application is the mounting of the rectifier within the center conductor of the insertion unit to minimize radio frequency inductive or interference effects between the radio frequency and direct-current circuits. Accordingly, connections for the direct-current electrical circuit are brought across the space between the outside and center conductors of the insertion unit. In measuring current or power, a series resistor is included in the radio frequency circuit of the center conductor, which must also be included in the direct-current circuit.

In order to obtain the response in the direct-current circuit which most faithfully represents the actual magnitude of the radio frequency quantity, it is desirable to make the direct-current connections physically as close to the sampling resistor as possible. Accordingly, in accordance with the present invention, the sampling resistor is made annular in form, being interposed in a section of the center conductor of the insertion unit and is provided with a radial aperture through which a direct-current connection may be made.

Furthermore, in order that bi-directional indications of current or energy flow may be obtained by using only a single series resistor for separate forward and reverse direct-current indicating circuits, the hollow cylindrically shaped thin film voltage sampling and terminating resistors are mounted in conductive horn shaped units on the axis of an annular thin film series resistor; rectifiers are coaxially mounted within the terminating resistors, one end of each rectifier being connected to aligned ends of the terminating resistors and also to a common end of a bridging resistor which carries rectified current radially across the dielectric space of the transmission line.

A better understanding of the invention will be afforded by the following detailed description of a suitable embodiment considered in conjunction with the accompanying drawings forming a part of the specification and constituting the best known mode of practising the invention.

In the drawings:

Figure 1 is a side elevational view, partly schematic, representing electrical circuits of an insertion device for making bi-directional measurements in high frequency coaxial line apparatus;

Figure 2 is a fragmentary view of a longitudinal section of the apparatus of Figure 1 represented as cut by an axial plane;

Fig. 2A is a fragmentary sectional detail showing construction of the circular button capacitors each comprising a central eyelet, a peripheral U sectioned ring and alternating circular armature plates and insulating sheets;

Figure 3 is a fragmentary detail showing a cross section of the center conductor of the apparatus of Fig. 2 represented as cut by plane 3—3;

Figure 4 is a fragmentary detail showing a cross section of the center conductor of the apparatus of Fig. 2 represented as cut by plane 4—4.

Figure 5 is a schematic circuit diagram of the apparatus of Figures 1 and 2;

Figure 6 is a circuit diagram illustrating the equivalent electrical circuit with respect to the right-hand direct-current indicating instrument or reflection meter with radio frequency energy traveling from the left hand end of the apparatus of Figures 1 and 2 to the right hand end as seen in the drawing; and Figure 7 is a corresponding circuit diagram with respect to a left-hand or forward power indicating instrument, Figure 6 being represented in the form of a bridge circuit to illustrate the null effect of reflected energy in a perfectly matched radio frequency system, and Figure 7 being redrawn as a lattice type of circuit in which the direct-current circuit is unbalanced and measurement is obtained of the full magnitude of the energy traveling in a forward direction in a perfectly matched radio frequency system.

Like reference characters are utilized throughout the drawings to designate like parts.

The form of insertion unit illustrated in Figures 1 and 2 comprises an outside conductor 11, a center conductor means, and conventional coaxial line connector units 12 at the ends, the units 12 being alike and the entire device being symmetrical with respect to an imaginary transverse center plane 13 so that the unit may be turned end for end without changing operating effect.

The center conductor means comprises physically separate conductor rods 14 and 15 and a series resistor SR electrically joining the conductor rods 14 and 15, only a single series resistor SR being required in the form of apparatus illustrated in the present application. The conductor rod 14 and likewise the conductor rod 15 have cylindrical chambers 16 and 17 therewithin with open ends toward each other and with closed ends 18 and 19. The chambers 16 and 17 together form a hollow region or general chamber for the center conductor means for receiving the insulator which carries the single series resistor SR and receiving in each chamber supplementary circuit elements for connection through direct current coaxial connector assemblies 20 to one or the other of the direct-current instruments Gf and Gr indicated in Figure 1 for measuring forward energy and reflected energy, respectively, with respect to a given end of the insertion unit.

There are two terminating resistors TRf and TRr mounted in the chambers 17 and 16 respectively. It will be observed that although the remaining direct-current elements in the chamber 16 are associated with the forward energy reading galvanometer or indicator Gf, the terminating resistor TRr is associated with the reflected energy indicator Gr, and the terminating resistor TRf associated with the forward indicator Gf is in the chamber 17.

The series resistor unit SR is a thin film of carbon or other conductive material carried by an insulator in the form of an annulus providing peripherally arranged resistor material and having reduced diameter end portions as described in greater detail in the copending application Serial No. 637,306, filed January 30, 1957 (filed concurrently herewith). The reduced-diameter end portions fit within counterbored ends of the conductor rods 14 and 15 or conductive elements mounted therein. In order to obtain a reflectionless termination within the minor coaxial line comprising the center conductor means 14, 15 and the terminating resistors TRr and TRf, conductive horn elements 21 and 22 are provided which surround the terminating resistors TRr and TRf respectively. In the structure illustrated, the horn elements 21 and 22 are in the form of metallic turnings of brass or the like, each having a counterbore 23 of such diameter as to receive the reduced diameter end of the series resistor annulus SR, an outer cylindrical surface 24 of such diameter as to fit within the counterbore at the open end of the chamber 16 or 17 with end flanges 25 for locating the horn members 21, 22 axially within the chambers 16 and 17, the external diameters of the flanges 25 conforming to the external diameter of the series resistor SR and the conductor rods 14 and 15 so as to form a smooth cylindrical surface for the center conductor rod means to avoid electrical discontinuities.

The ends of the conductor rods 14 and 15 may be slotted as represented at 26 for resiliently securing the horn members 21 and 22 in place. Each of the horn members has a tapered bore with the bore tapered along a curved surface 27. The curve is determined in the manner disclosed in the copending application Serial No. 692,116, filed August 21, 1946, in order to obtain a reflectionless termination with the resistance of the terminating resistor TRr or TRf according to the characteristic impedance of the radio frequency apparatus with which the elements are used. As shown, a larger diameter end of the bore is at the counterbore 23 where electrical contact is made with the adjacent end of the annular resistor SR. The bore tapers to a minimum diameter at the outward end 28 where it receives a silvered or conductively banded end 29 of the terminating resistor TRr or TRf.

The inward ends of the terminating resistors TRr and TRf are also provided with conductive bands 31 which are connected to contact pins or lugs 32 received within sockets 33 formed within a contact fitting 34 mounted within an annular insulator 35 which is, in turn, mounted within the annular ceramic insulator 40 having on its cylindrical outer surface the resistive film constituting the resistor SR for insulatingly supporting the contact fitting 34 within the center of the annular resistor SR. The terminating resistors TRr and TRf are tubular in form preferably comprising insulating tubes 36 of ceramic or the like having cylindrical surfaces 37 coated with suitable resistive material, in the manner well understood by those skilled in the art, extending to the conductor bands 29 and 31.

The rectifier elements are mounted within each of the terminating resistors TRr and TRf. If desired, for accomplishing compactness, the ceramic insulator tubes 36 may constitute the insulating casings of conventional type rectifier units having aligned end contact pins or lugs 32 and 38. A suitable arrangement comprises a germanium pellet 39 contacted by a platinum-ruthenium whisker wire 41, the pellet 39 being connected to the contact lug 38 and the whisker wire 41 being connected to the contact pin or lug 32.

The terminal pin or lug 32 of the rectifier 39, 41 is connected to the conductor band 31 so as to make contact with one end of the resistive coating 37 of the terminating resistor TRr or TRf. However, the outwardly extending terminal pin or lug 38 that is away from the contact fitting 35 is insulated from the conductor band 29 and the resistive coated surface 37 for connection to a direct-current indicating instrument. The direct-current connection is made preferably through a filter unit of the resistance-capacity type comprising button condensers 42, 43 and 44 and resistors 45 and 46, the condenser 42 constituting a peaking condenser acting in conjunction with the rectifier 39, 41 to produce a direct-current voltage representative of the magnitude of the sample of radio-frequency energy produced in the terminating resistors GRr and GRf and the series resistor SR. It will be understood that the filter unit elements to the right of imaginary plane 13—13, like the other elements enclosed within the chamber 16, 17, are symmetrical with respect to those at the left and need, therefore, not be specifically described.

The button condensers 42, 43 and 44 are of the conventional type having peripheral terminals making electrical contact with the inner walls of the cylindrical chambers within which they are mounted and center terminals connected on points in the electrical through circuit from the rectifier contact pin 38 through the resistors 45 and 46, and contact fittings 47 and 48 insulatingly mounted in the ends 18 and 19 of the chambers 16, 17 by means of hollow insulators 51, 52. For bringing electrical circuits out to the indicators Gf and Gr, access resistors 53 and 54 are provided radially extending from the contact fittings 47 and 48 through registering radial apertures 55 and 56 in the insulators 51 and 52 and the conductor rods 14, 15 at the closed ends thereof. Connections are made to the indicators Gf and Gr from the outer ends of the access resistors 53 and 54 in a conventional manner by coaxial direct-current connections described in the aforesaid copending application, Serial No. 637,306. For providing a common direct-current return circuit to the indicating instruments through the outside conductor 11, a single bridging resistor BR is provided radially extending from the contact fitting 34 to a boss 57 mounted on the outside conductor 11 and having spring fingers 58 grasping the outer end of the rod BR. Registering radial apertures 59 are provided in the insulator 35 and the annular resistor SR for enabling the bridging resistor BR to extend radially without contacting the center conductor means.

Double throw switches 61 and 62 are shown in Figure 5 merely in order to illustrate schematically the fact that the insertion unit may be turned end for end or that the relative positions of the signal generator and the load may be interchanged. In practice, the use of such switches is avoided to eliminate possibility of reflections. In Figure 5 a reflectionless termination 63 having the same characteristic impedance as the signal generator and the insertion unit is connected to the unit for adjustment and calibration purposes in order to have the apparatus perfectly matched. With the switches 61 and 62 in the position shown, the direct-current instrument Gf measures the forward traveling wave energy from the signal generator and the indicator Gr measures the reflected wave energy which would travel back from the right hand end of the apparatus to the left hand end if the apparatus were not perfectly matched. On the other hand, with the positions of the double-throw switches 61 and 62 changed, the indicator Gr would measure the forward wave energy from the signal generator from the right hand end and the indicator Gf would measure reflected wave energy. With the switches 61 and 62 in the position illustrated in Figure 5, the radio frequency wave energy from the signal generator is applied to the outside conductor and the center conductor means, respectively, at the points $a$ and $g$ and the radio frequency energy travels through the annular resistor SR in the center conductor means. For obtaining the measurement of power, a current sample is obtained by the voltage drop in the series resistor SR and a voltage sample is obtained by bridging the voltage divider consisting of the bridging resistor BR and the termination resistor TRf between the points $b$ and $c'$, the voltage drop in the resistor TRf serving as the voltage sample for the direct-current instrument Gf. On the other hand, for the instrument Gr the voltage sample consists of the voltage drop in the resistor TRr in a series circuit between points $b$ and $c$ through the bridging resistor BR and the terminating resistor TRr.

With respect to the instrument Gr, the voltage drops in the resistors SR and TRr are applied in a series circuit through the rectifier 39, 41 and the peaking condenser 42 so as to produce a uni-directional voltage across the plates of the peaking condenser 42 to which the direct-current instrument Gr is responsive, representative of the magnitude of the reflected energy as the wave energy travels from the right hand end to the left hand end of Figure 5.

As illustrated in Figure 6, the elements SR and TRr with the bridging resistor BR and the characteristic impedance Zo form a balanced bridge so that the instrument Gr reads "0" with perfectly matched apparatus and no reflected energy.

With respect to the instrument Gf, however, there is an unbalanced direct-current circuit as illustrated by the lattice network shown in Figure 7 with the resistors SR and TRf connected between the points $c$ and $e$ to produce a rectified voltage across the condenser 42.

As illustrated schematically in Figure 7, the bridging resistor BR, serving as an access resistor to produce the voltage sample, passes through the series resistor SR so that the voltage sample is obtained at the same physical point as the current sample and the power measurement represents a function of voltage and current at the same instant and location in the electromagnetic field.

In accordance with the patent statutes, the principles of the present invention may be utilized in various ways, numerous modifications and alterations being contemplated, substitution of parts and changes in construction being resorted to as desired, it being understood that the article and apparatus shown in the drawings and described above and the particular method set forth are given merely for purposes of explanation and illustration without intending to limit the scope of the claims to the specific details disclosed.

What I claim and desire to secure by Letters Patent of the United States of America is:

1. In a reflectometer unit, an outside tubular conductor, and coaxial center conductor means for insertion between a radio frequency energy source and a radio frequency load, the center conductor means having a coaxial cylindrical chamber therein extending between first and second ends of the chamber, an annular resistor interposed in said center conductor means intermediate the ends of the chamber for introducing series resistance in the center conductor means, first and second contact fittings mounted within the ends of the chamber insulated from the center conductor means, the center conductor means having first and second radial apertures at the ends of the chamber, the outside conductor having registering apertures opposite said center conductor radial apertures, access resistors for forward and reverse energy indicating direct-current instruments extending from the first and second conductor fittings respectively through said apertures and across the space between the outside conductor and the center conductor means, resistance-capacity filters within the ends of said chamber adjacent the first and second contact fittings, said filters comprising condenser means of the button condenser type having peripheral terminals contacting said center conductor means at the walls of said chambers and having center terminal means, and resistors with aligned contact pins connected electrically and mechanically to center terminal means of adjacent condenser means for supporting said resistors coaxially within said chamber, one of said condenser means at each end of the chamber having its center terminal means electrically connected to one of said first and second contact fittings, a third contact fitting, mounted within said annular resistor and insulated therefrom, first and second tapered bore tubular conductors mounted within said chamber, each between one of said filter units and the said annular resistor, the larger diameter end of the tapered bore being toward the annular resistor and electrically connected thereto, first and second cylindrical rectifier units on either side of the annular resistor, each having a contact prong connected to said third contact fitting and a contact prong connected to the center terminal of the condenser means closest to the annular resistor, each of said rectifier units having an insulating housing with a resistive coating thereon to form a hollow cylindrical termination resistor, each of said termination resistors being connected at one end electrically to the smaller diameter end of the bore of the tapered bore tubular conductor member and at the other end to a contact prong of the rectifier and to the said third contact fitting, said annular resistor having a radial aperture, and a third access resistor extending through said aperture radially from said third contact fitting to the outside conductor for completing the direct-current electrical circuit for either of the first and second access resistors.

2. A center conductor means for a coaxial line insertion type reflectometer comprising conductive rod means having a cylindrical chamber therein coaxial with the rod means extending between first and second ends of the chamber, hollow insulators in the ends of the chamber, first and second contact fittings within said insulators, the hollow insulators and the chambered conductive rod means having radial apertures at each end of the chamber whereby electrical connection may be made with the said contact fittings from externally without making electrical connection to the conductive rod means, an annular resistor interposed in said conductive rod means intermediate the ends of said chamber with an outside diameter conforming substantially to that of the rod means for interposing series resistance in said conductive rod means, an annular insulator within said annular resistor unit, a third contact fitting within said annular insulator, said annular resistor and insulator having radial registering apertures whereby a third electrical connection may be made from externally to said third fitting without contacting the rod means or the annular resistor, first and second terminating resistors mounted in said chamber coaxially on either side of said annular resistor, each having an end connected to the third contact fitting and having a remaining end, tapered bore conductors mounted within said chamber surrounding said terminating resistors with the larger diameter ends of the bores toward the annular resistor for electrical contact to said annular resistor, the smaller diameter ends of the tapered bores being electrically connected to the remaining ends of said terminating resistors, the terminating resistors being hollow and each having coaxially mounted therein a rectifier unit with one terminal connected to said third contact fitting and to one end of the terminating resistor and having a second terminal insulated from said terminating resistor and said tapered bore conductive means but having an electrical connection to one of said first and second contact fittings.

3. A center conductor means as in claim 2 wherein the connection between each of said first and second contact fittings and the rectifier second terminal includes resistance-condenser filter means coaxially mounted in said chamber.

4. In a coaxial line type reflectometer having an outer conductor, center conductor means therefor comprising a conductor rod having a coaxial chamber in one end thereof, said chamber having a closed end and an open end, an annular resistor mounted in the open end of said chamber electrically connected to the end of the conductor rod, a contact fitting mounted in the closed end of said chamber insulated therefrom, a second contact fitting mounted within the annular resistor insulated therefrom, a terminating resistor mounted within said chamber coaxially between said contact fittings electrically connected at one end to the second contact fitting and having an electrical connection at the other end to the annular resistor, a tapered bore conductor horn surrounding said terminating resistor connected at the larger diameter bore end to one end of said annular resistor and to said conductor rod and connected at the smaller diameter bore end of the horn to the end of said terminating resistor away from said second contact fitting, said terminating resistor being hollow and having mounted therein a rectifier with one terminal electrically connected to the second contact fitting and to one end of the terminating resistor and having a second terminal insulated from said terminating resistor and said conductor horn and having an electrical connection to said first contact fitting.

5. Conductor means as in claim 4 wherein the conductor rod at the closed end of the chamber and the annular resistor at the open end of the chamber have radial apertures therein whereby electrical connections may be brought into said center conductor means to the rectifier contact means without making electrical contact with the center conductor means.

6. Center conductor means as in claim 5 wherein the electrical connection between the second rectifier terminal and the first contact fitting comprises resistance-capacity filter means for filtering radio frequency energy out of the circuit of the rectifier.

7. Center conductor means as in claim 6 wherein the filter means comprises button type condenser means having peripheral contact means at the surface of the chamber and center terminal means, and resistor means, the resistor means being connected serially between the said first contact fitting and said second terminal of the rectifier, the said second rectifier terminal and said first contact fitting making electrical contact with center terminal means of the condenser means.

8. In a coaxial line hollow center conductor type insertion unit, a sampling element comprising in combination a conductive horn with a bore tapering from larger to smaller internal diameter ends for mounting coaxially within a hollow center conductor, an annular resistor mounted adjacent said horn coaxially therewith with an end in electrical contact with the horn at the larger diameter end of its bore for introducing series resistance, a hollow terminating resistor mounted within said horn coaxial therewith, a contact fitting mounted within and insulated from said annular resistor, said terminating resistor having a first end connected to said horn at the smaller diameter of its bore and a second end connected to said contact fitting, a rectifier within said terminating resistor having a first terminal connected to said contact fitting and the second end of the terminating resistor and having a second terminal insulated from said terminating resistor and said horn for connection to a direct-current measuring circuit.

9. An element as in claim 8 wherein the annular resistor has a radial aperture for making a connection from a direct-current measuring circuit to said contact fitting without making contact with the center conductor means or the horn.

10. In a coaxial line hollow center conductor type insertion unit, a sampling element comprising in combination a tubular conductor of circular cross section for mounting within a hollow center conductor of a coaxial transmission line, an annular resistor mounted adjacent said tubular conductor coaxially therewith with an end in electrical contact with one end of such tubular conductor and connected for and introducing series resistance in the center conductor, an elongated hollow terminating resistor mounted within the tubular conductor in coaxial relation, a contact fitting mounted within and insulated from said annular resistor, said terminating resistor having one of its ends connected to one end of said tubular conductor and the other of its ends connected to said contact fitting, a rectifier within said terminating resistor, said rectifier having a first terminal connected to said contact fitting and the said other end of the terminating resistor and having a second terminal insulated from said terminating resistor and said tubular conductor for connection to a direct-current measuring circuit.

11. An article of manufacture for use in an electrical high frequency coaxial line transmission system, the combination comprising an elongated tubular insulator having resistive material coated on the peripheral surface thereof, a rectifier mounted within said insulator having a first terminal at one end of the insulator connected to one end of the resistive coating and having a second terminal at the other end of the insulator insulated from said coating, and a tapered tubular conductor of circular section surrounding the insulator in coaxial relation, said conductor having an open large diameter end spaced from the one end of the insulator and the resistive coating and having a small diameter end electrically connected to the resistive coating at said other end of the insulator, the first terminal of the rectifier and the open end of the tapered tubular conductor constituting terminals of a substantially reflectionless coaxial termination comprising the tapered conductor and the resistive coating.

12. In a coaxial line type reflectometer having an outer conductor, center conductor means therefor comprising a conductor rod having a chamber in one end thereof, said chamber having a closed end and an open end, an annular resistor mounted in the open end of said chamber electrically connected to the end of the conductor rod, a contact fitting mounted in the closed end of said chamber insulated therefrom, a second contact fitting mounted within the annular resistor insulated therefrom, a hollow terminating resistor mounted within said chamber between said contact fittings electrically connected at one end to the second contact fitting and having an electrical connection at the other end to the annular resistor, a tubular conductor surrounding said terminating resistor connected at one end to one end of said annular resistor and to said conductor rod and connected at its other end to the end of said terminating resistor away from said second contact fittings, and a rectifier within the terminating resistor, said rectifier having one terminal electrically connected to the second contact fitting and to one end of the terminating resistor and having a second terminal insulated from said terminating resistor and said tubular conductor and having an electrical connection to said first contact fitting.

13. A center conductor means for a coaxial line insertion type reflectometer comprising conductive rod means having a chamber therein extending between first and second ends of the chamber, insulators in the ends of the chamber, first and second contact fittings supported by said insulators, the insulators and the chambered conductive rod means having radial apertures in registered relation at each end of the chamber whereby electrical connection may be made with the said contact fittings from externally without making electrical connection to the conductive rod means, an annular resistor interposed in said conductive rod means intermediate the ends of said chamber with an outside diameter conforming substantially to that of the rod means for interposing series resistance in said conductive rod means, an annular insulator within said annular resistor unit, a third contact fitting within said annular insulator, said annular resistor and insulator having radial registering apertures whereby a third electrical connection may be made from externally to said third fitting without contacting the rod means or the annular resistor, first and second terminating resistors mounted in said chamber on either side of said third fitting, each terminating resistor having one end electrically connected to said third fitting and having a remote end, tubular conductors mounted within said chamber surrounding said terminating resistors, one end of each such tubular conductor being electrically connected to the annular resistor, the other ends of the tubular conductors being electrically connected to the remote ends of said terminating resistors, rectifier units each having one terminal connected to said third contact fitting and having a second terminal insulated from said terminating resistor and said tubular conductors but having an electrical connection to one of said first and second contact fittings.

14. In a reflectometer unit, an outside tubular conductor and center conductor means arranged coaxially in spaced relation for insertion between a radio frequency energy source and a radio frequency load, the center conductor means having a chamber therein, an annular resistor interposed in said center conductor means intermediate the ends of the chamber for introducing series resistance in the center conductor means, first and second contact fittings, means mounting said fittings within the chamber in insulated relation to the center conductor means, the center conductor means having axially spaced first and second radial apertures, the outside conductor having radial apertures opposite said center conductor radial apertures, access resistors for forward and reverse energy indicating direct-current instruments extending from the first and second contact fittings respectively through said apertures of the center conductor means and the outside conductor and across the space between the outside conductor and the center conductor means, two axially spaced resistance-capacity filters within the chamber, said filters each comprising condenser means of the button condenser type having peripheral terminals contacting said center conductor means at the wall of said chamber and having center terminal means, and a resistor having contact pin means connected electrically and mechanically to said center terminal means of said condenser means for supporting said resistor, the condenser means of one of said filters having its center terminal means electrically connected to said first contact fitting, the condenser means of the other of said filters having its center terminal means electrically connected to said second contact fitting, a third contact fitting means mounting said third fitting within said annular resistor in insulated relation, first and second tubular conductors mounted within said chamber, each between one of said filters and said annular resistor, one end of each tubular conductor being toward the annular resistor and electrically connected thereto, first and second rectifiers each having an inner contact prong connected to said third contact fitting and an outer contact prong, the outer prong of the first rectifier being electrically connected to one of the filters, the outer prong of the second rectifier being electrically connected to the other filter, first and second hollow cylindrical termination resistors, each of said termination resistors being electrically connected at one end to the other end of one of the tubular conductors and at the other end to both the inner contact prong or one of the rectifiers and to the said third contact fitting, said annular resistor having a radial aperture, and a third access resistor extending through said aperture radially from said third contact fitting to the outside conductor for completing the direct-current electrical circuit for either of the first and second access resistors.

15. In a coaxial line insertion unit, an outside conductor, center conductor means comprising a pair of circular sectional rods within and spaced from the outside conductor, each rod being formed with an internal chamber opening through one end, the rods being disposed in end to end coaxial relation to one another and to the outside conductor with the chamber openings confronting one another in spaced relation, an annular resistor of circular section in the space between the rod ends, means electrically connecting the ends of the resistor to the ends of the rods to place the resistor in series between the rods, a contact fitting, means supporting said fitting within the annular resistor in insulated coaxial relation, a pair of tubular conductors received one in the chamber of one rod and the other in the chamber of the other rod, said tubular conductors having inner ends spaced from one another by and electrically connected to the annular resistor and having outer ends remote from the fitting, a pair of termination resistors disposed one in said one tubular conductor and the other in said other tubular conductor, each termination resistor having an inner end electrically connected to the fitting and an outer end electrically connected to the outer end of the tubular conductor in which it is disposed, said access resistor being formed with a radial aperture between its ends, a pair of rectifiers one in the one rod chamber and the other in the other rod chamber, one terminal of each rectifier being electrically connected to the contact fitting, first access means connected to the other terminal of the one rectifier and extending radially across the space between the center conductor means and the outside conductor for connecting the rectifier to a direct-current indicator external to the unit, second access means similarly connected to the other terminal of the other rectifier and extending radially across the said space between the conductors for connection to such an indicator, and third access means electrically connected to the contact fitting, extending through the aperture in the annular resistor without electrically contacting the latter, and across the space between the conductors for connection to such an indicator.

References Cited in the file of this patent

UNITED STATES PATENTS

| | | |
|---|---|---|
| 2,399,645 | Latimer | May 7, 1946 |
| 2,557,122 | Leiphart | June 19, 1951 |
| 2,590,477 | Weber et al. | Mar. 25, 1952 |